US010133406B2

(12) United States Patent
Choi

(10) Patent No.: US 10,133,406 B2
(45) Date of Patent: Nov. 20, 2018

(54) TOUCH SENSOR

(71) Applicant: DONGWOO FINE-CHEM CO., LTD., Jeollabuk-do (KR)

(72) Inventor: Byung Jin Choi, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 115 days.

(21) Appl. No.: 15/358,671

(22) Filed: Nov. 22, 2016

(65) Prior Publication Data

US 2017/0147133 A1    May 25, 2017

(30) Foreign Application Priority Data

Nov. 23, 2015   (KR) .................... 10-2015-0163994

(51) Int. Cl.
*G06F 3/041*  (2006.01)
*G06F 3/044*  (2006.01)

(52) U.S. Cl.
CPC ............ *G06F 3/0416* (2013.01); *G06F 3/044* (2013.01); *G06F 2203/04102* (2013.01); *G06F 2203/04111* (2013.01)

(58) Field of Classification Search
CPC ..... G06F 2203/0411; G06F 2203/0412; G06F 2203/0413
See application file for complete search history.

(56) References Cited

U.S. PATENT DOCUMENTS

2011/0062146 A1*  3/2011  Kuriki .................. H05B 3/84
219/553

2015/0015498 A1*  1/2015  Wang .................... G06F 3/041
345/173
2015/0277627 A1*  10/2015  Pang .................... G06F 3/044
345/174

FOREIGN PATENT DOCUMENTS

| KR | 2011-0021532 A | 3/2011 |
| KR | 10-2012-0018046 A | 2/2012 |
| KR | 10-2014-0021255 A | 2/2014 |
| KR | 10-2014-0044118 A | 4/2014 |

OTHER PUBLICATIONS

Office action dated Dec. 19, 2016 from Korean Intellectual Property Office in a counterpart Korean Patent Application No. 10-2015-0163994.

* cited by examiner

*Primary Examiner* — Kevin M Nguyen
(74) *Attorney, Agent, or Firm* — The PL Law Group, PLLC

(57) ABSTRACT

A touch sensor includes a sensing pattern including a first pattern and has unit patterns connected with each other through connection parts thereof, and a second pattern having separated unit patterns, and bridge electrodes connecting the separated unit patterns, wherein at least a portion of a boundary between the first pattern and the second pattern includes convex parts of a curved line and concave parts of a curved line between the convex parts, and the convex part of the first pattern and the concave part of the second pattern face each other, and the concave part of the first pattern and the convex part of the second pattern face each other. The touch sensor has excellent touch sensitivity while suppressing an occurrence of cracks in the sensing pattern due to a stress concentration during bending, and preventing the sensing pattern from being viewed by a user.

10 Claims, 11 Drawing Sheets

TOUCH SENSOR

CROSS-REFERENCE TO RELATED APPLICATIONS

This application claims the priority of Korean Patent Application No. 10-2015-0163994 filed on Nov. 23, 2015, in the Korean Intellectual Property Office, the disclosure of which is incorporated herein by reference.

BACKGROUND

1. Technical Field

The present invention relates to a touch sensor.

2. Description of the Related Art

A touch screen panel is an input device capable of inputting a command of a user by a touch of a specific position displayed on a screen of an image display device, etc., with a finger of the user or an object such as a touch pen or a stylus pen.

For this, in the image display device provided with the touch screen panel on a front face thereof, a force applied to the contact position by a direct touch with the finger of a user or the object is converted to an electrical signal. Therefore, an instruction corresponding to the contact position selected by the user is input to the image display device as an input signal generated by the electrical signal.

Since a separate input device such as a keyboard and a mouse which are connected to the image display device to input an operation command is replaced by the above-described touch screen panel, it is a recent trend to gradually enlarge the application fields of the touch screen panel.

Various types of touch screen panel such as a resistive film type, surface acoustic wave type using an infrared or ultrasonic wave, capacitance touch type, or the like, are known in the related art for implementing the touch screen panel. Among these, in the capacitance type touch screen panel, when the finger of a user or the object touches a specific position displayed thereon, a change in capacitance foiled by conductive sensing patterns with adjacent other sensing patterns or a ground electrode is detected by the image display device equipped with the touch screen panel, and thereby a force applied to the contact position is converted to an electrical signal.

The above-described touch screen panel is adhered on an outer surface of a flat panel display device such as a liquid crystal display device, or an organic electroluminescence display device to be commercialized in many cases. Accordingly, the touch screen panel needs to have characteristics such as a high transparency and a small thickness.

In addition, recently, a flexible flat panel display device has been developed, and in accordance with this trend, it is also necessary for the touch screen panel adhered on the flexible flat panel display device to have flexible characteristics.

However, if a bending force is applied to the touch screen panel, touch sensing patterns formed thereon may be broken. Due to the above-described problem, it is difficult to achieve flexible properties using the conventional flexible flat panel display device.

Korean Patent Laid-Open Publication No. 2011-21532 discloses a touch screen panel and a method of manufacturing the same, however, it did not suggest an alternative idea to solve the above-described problems.

SUMMARY

Accordingly, it is an aspect of the present invention to provide a touch sensor having excellent flexibility.

In addition, another aspect of the present invention is to provide a touch sensor with reduced visibility of electrodes.

The above one or more aspects of the present invention will be achieved by at least one of the following characteristics:

(1) A touch sensor including: a sensing pattern including a first pattern which is formed in a first direction and has unit patterns connected with each other through connection parts thereof, and a second pattern which has unit patterns formed with being separated from each other in a second direction; and bridge electrodes which connect the separated unit patterns of the second pattern, wherein at least a portion of a boundary between the first pattern and the second pattern includes a plurality of convex parts of a curved line and a plurality of concave parts of a curved line between the convex parts, and the convex part of the first pattern and the concave part of the second pattern face each other, and the concave part of the first pattern and the convex part of the second pattern face each other.

(2) The touch sensor according to the above (1), wherein the concave part and the convex part have a radius of curvature of 0.05 to 10 mm.

(3) The touch sensor according to the above (1), wherein the concave part and the convex part have a radius of curvature of 0.1 to 3 mm.

(4) The touch sensor according to the above (1), wherein a boundary in which the first pattern and the connection part contact with each other is a curved line.

(5) The touch sensor according to the above (1), wherein a boundary which face the connection part of the second pattern is a curved line.

(6) The touch sensor according to the above (1), further including dummy patterns which are formed between the first pattern and the second pattern with being electrically separated therefrom.

(7) The touch sensor according to the above (6), wherein the dummy pattern is made of the same material as the sensing pattern.

(8) The touch sensor according to the above (6), wherein at least a portion of the boundary of the dummy pattern is a curved line corresponding to the convex parts and the concave parts of the first and second patterns.

(9) The touch sensor according to the above (6), wherein the dummy pattern includes a plurality of sub dummy patterns which are separated from each other.

(10) An image display device including the touch sensor according to the above (1).

The touch sensor of an embodiment of the present invention may reduce an occurrence of cracks in the sensing pattern due to a stress concentration during bending. Thereby, the touch sensor has excellent flexibility and may be utilized as a flexible touch sensor.

The touch sensor of an embodiment of the present invention may prevent the sensing pattern from being viewed by a user.

The touch sensor of an embodiment of the present invention has excellent touch sensitivity.

BRIEF DESCRIPTION OF THE DRAWING

The above and other aspects, features and other advantages of the present invention will be more clearly understood from the following detailed description taken in conjunction with the accompanying drawings, in which.

DETAILED DESCRIPTION

Figure 1:
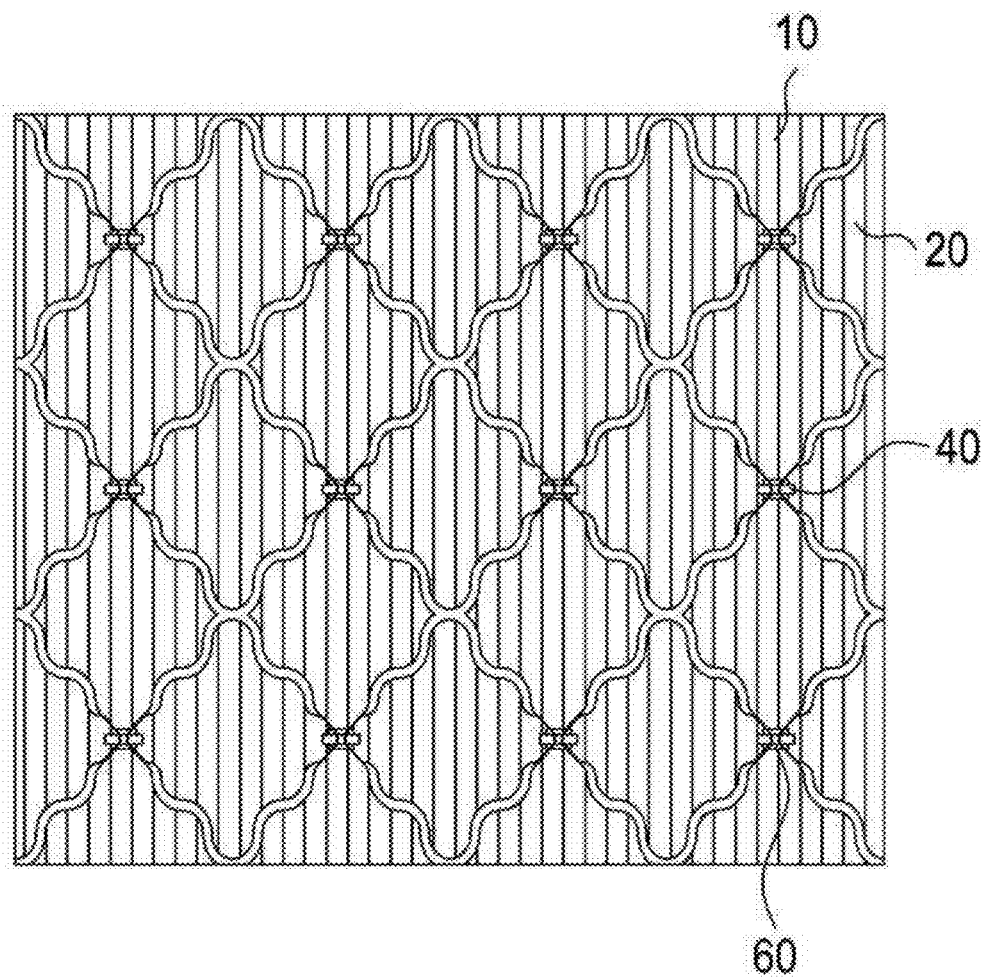
FIG. 1 is a schematic plan view of a touch sensor according to an embodiment of the present invention.

The present invention discloses a touch sensor including: a sensing pattern including a first pattern which is formed in a first direction and has unit patterns connected with each other through connection parts thereof, and a second pattern which has unit patterns formed with being separated from each other in a second direction; and bridge electrodes which connect the separated unit patterns of the second pattern, wherein at least a portion of a boundary between the first pattern and the second pattern includes a plurality of convex parts of a curved line and a plurality of concave parts of a curved line between the convex parts, and the convex part of the first pattern and the concave part of the second pattern face each other, and the concave part of the first pattern and the convex part of the second pattern face each other. Thereby, the touch sensor of the present invention has excellent touch sensitivity while suppressing an occurrence of cracks in the sensing pattern due to a stress concentration during bending, and preventing the sensing pattern from being viewed by a user.

Hereinafter, the present invention will be described in detail.

A touch sensor of the present invention includes a sensing pattern which including first patterns and second patterns, and bridge electrodes.

The sensing pattern may include a first pattern 10 which is formed in a first direction and has unit patterns connected with each other through connection parts 30 thereof, and a second pattern 20 which has unit patterns formed with being separated from each other in a second direction.

The first pattern 10 and the second pattern 20 are disposed in different directions from each other. For example, the first direction may be an X-axis direction, and the second direction may be a Y-axis direction orthogonal to the first direction, but it is not limited thereto.

The first and second patterns 10 and 20 provide information on X and Y coordinates of a touched point. Specifically, when a finger of a user or an object touches a cover window substrate, a change in capacitance depending on a contact position is detected and transferred to a driving circuit through the first and second patterns 10 and 20, and a position detecting line. Then, the change in capacitance is converted to an electrical signal by X and Y input processing circuits (not illustrated) to identify the contact position.

In this regard, the first and second patterns 10 and 20 have to be formed in the same layer of the substrate, and the respective patterns have to be electrically connected with each other to detect the touched position. However, the unit patterns of the first pattern 10 are connected with each other through the connection parts 30, while the unit patterns of the second pattern 20 are separated from each other in an island form, thereby additional bridge electrodes 40 are needed to electrically connect the unit patterns of the second pattern 20 with each other. The bridge electrode 40 will be described below.

In the sensing pattern according to the present invention, at least a portion of a boundary between the first pattern and the second pattern includes a plurality of convex parts of a curved line and a plurality of concave parts of a curved line between the convex parts.

FIG. 1 is a schematic plan view of a touch sensor according to an embodiment of the present invention. As illustrated in FIG. 1, at least a portion of the boundary between the first pattern and the second pattern may include the plurality of convex parts of a curved line and the plurality of concave parts of a curved between the convex parts.

In a case of a conventional touch sensor including the first pattern and the second pattern having an angled boundary, a stress is concentrated in the angled boundary portion when bending or rolling the touch sensor due to a low flexibility, such that cracks may occur at the portion. However, as the touch sensor of the present invention, in a case of the touch sensor in which at least a portion of the boundary between the first pattern and the second pattern includes the plurality of convex parts of a curved line and the plurality of concave parts of a curved between the convex parts, it is possible to alleviate the stress from being concentrated to the boundary, thus to reduce an occurrence of cracks during bending. Therefore, the touch sensor of the present invention may have more excellent flexibility than the conventional touch sensor, and thereby may be utilized as a flexible touch sensor.

In addition, since the boundary has a complicated pattern of a curved line form, irregular reflection at the boundary of the sensing pattern may be increased, thereby preventing the sensing pattern from being viewed by a user.

Figure 2:
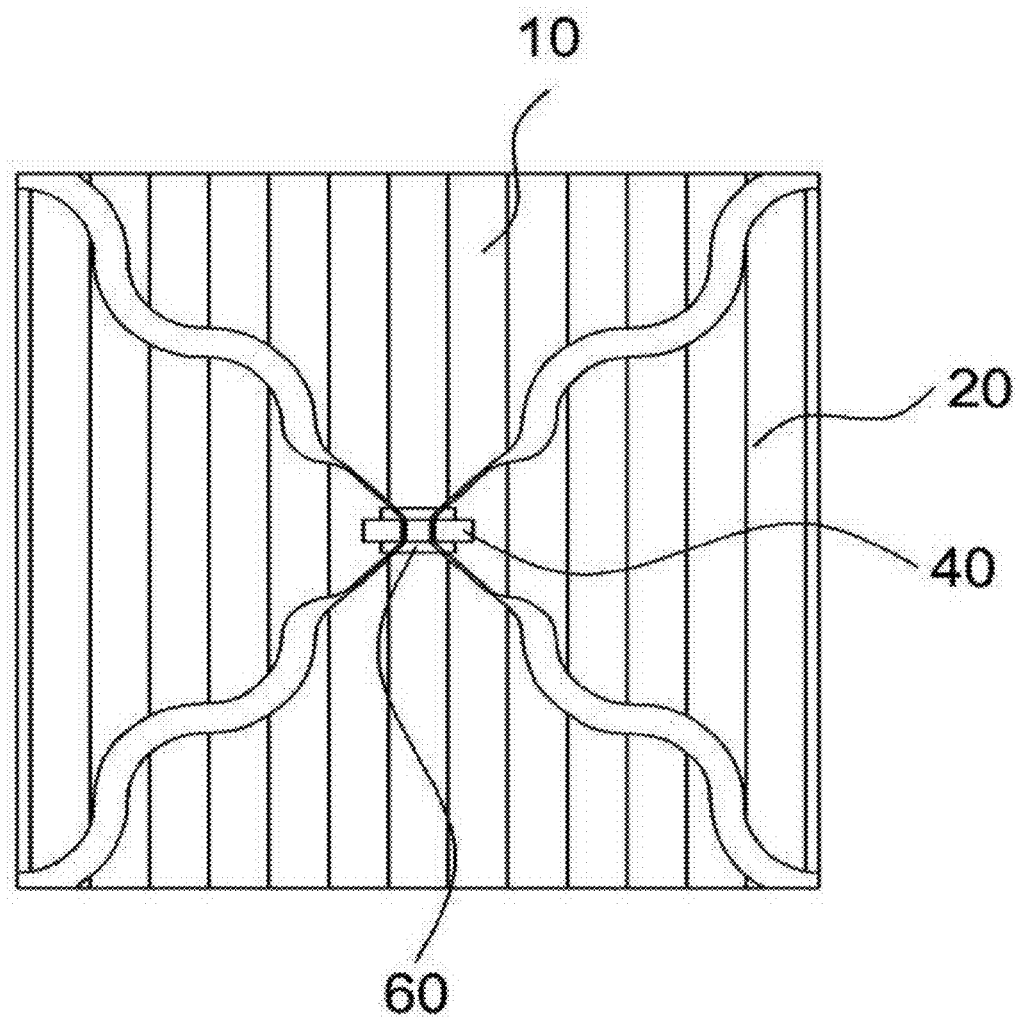
FIGS. 2 to 6 are enlarged plan views of a portion including first and second patterns, a bridge electrode, and an insulation layer in the touch sensor according to the embodiment of the present invention.

The at least a portion of the boundary including the plurality of convex parts of a curved line and the plurality of concave parts of a curved between the convex parts is not particularly limited, and as illustrated in FIGS. 1 and 2, the portion may be an entire portion except for a boundary adjacent to an intersection portion of the first pattern and the bridge electrode to be described below, or the entire boundary between the first pattern and the second pattern.

Further, as illustrated in FIGS. 1 and 2, the convex part of the first pattern and the concave part of the second pattern are disposed so as to face each other, and the concave part of the first pattern and the convex part of the second pattern face are disposed so as to face each other. In this case, a cross-sectional area of a dummy pattern to be described is maximized, such that a displacement (Delta Cm) of the electrostatic capacitance induced in a human body or a conductor at the time of touch may be largely increased, and thereby, touch sensitivity may be improved.

Furthermore, since the boundary has the complicated pattern, it is possible to prevent the sensing pattern from being viewed, and reduce a distance between the first pattern and the second pattern. Thereby, the touch sensitivity may be improved while preventing the sensing pattern from being viewed from an outside.

Radiuses of curvature of the concave part and the convex part of a curved line are not particularly limited, and for example, these parts may have a radius of curvature of 0.05 to 10 mm. If the radius of curvature is less than 0.05 mm, the boundary is nearly a right angle rather than the curved line, such that effects of suppressing an occurrence of cracks and improving the visibility of the sensing pattern may be insignificant. If the radius of curvature thereof exceeds 10 mm, the boundary is nearly a straight line, such that it is difficult to implement dense concavo-convexes, and effects of suppressing an occurrence of cracks and improving the visibility may be insignificant. In terms of maximizing suppression of an occurrence of cracks and improvement of the visibility by implementing the dense concavo-convexes, the concave and convex parts may have a radius of curvature of 0.1 to 3 mm.

The unit patterns of the first pattern are connected with each other through the connection parts, and as illustrated in FIGS. 1 and 2, the boundary in which the unit pattern of the first pattern and the connection part are contact with each other may be a curved line. In this case, similarly, it is possible to prevent an occurrence of cracks due to the stress concentrated to the angled boundary.

In addition, by the similarly reason, as illustrated in FIGS. 1 and 2, a boundary which face the connection part of the second pattern may be a curved line.

A thickness of the sensing pattern is not particularly limited but may be, for example, 10 to 350 nm, respectively. If the thickness of the sensing pattern is less than 10 nm, electrical resistance may be increased to reduce touch sensitivity, and if the thickness thereof exceeds 350 nm, transmittance may be increased to cause a problem entailed in the visibility of the sensing pattern.

Types of metal forming the sensing pattern are not particularly limited so long as they have excellent electric conductivity and low resistance, and may include, for example, molybdenum, silver, aluminum, copper, palladium, gold, platinum, zinc, tin, titanium or an alloy of two or more thereof.

Any transparent electrode material known in the related art may be further used other than the above-described materials. For example, indium-tin oxide (ITO), indium-zinc oxide (IZO), zinc oxide (ZnO), indium-zinc-tin oxide (IZTO), cadmium-tin oxide (CTO), copper oxide (CO), poly(3,4-ethylenedioxythiopene) (PEDOT), carbon nanotube (CNT), graphene, etc., may be used.

A method of forming the sensing pattern is not particularly limited, and may be formed, for example, by various thin film deposition techniques such as a physical vapor deposition (PVD) method, a chemical vapor deposition (CVD) method, or the like. For example, the sensing pattern may be formed by reactive sputtering which is an example of the PVD method. The sensing pattern may be formed by photolithography other than the above-described methods.

The bridge electrode 40 connects the separated unit patterns of the second pattern 20. In this case, the bridge electrode 40 have to be insulated from the first pattern 10 of the sensing pattern, and for this, an insulation layer 60 may be formed therebetween, which will be described below.

Any transparent electrode material known in the related art may be used for the bridge electrode 40 without particular limitation thereof. For example, indium-tin oxide (ITO), indium-zinc oxide (IZO), zinc oxide (ZnO), indium-zinc-tin oxide (IZTO), cadmium-tin oxide (CTO), copper oxide (CO), poly(3,4-ethylenedioxythiopene) (PEDOT), carbon nanotube (CNT), graphene, etc., may be used. These materials may be used alone or in a combination of two or more thereof, and indium-tin oxide (ITO) is preferably used.

A material having excellent electric conductivity and low resistance may be used for the bridge electrode without particular limitation thereof, and may include, for example, molybdenum, silver, aluminum, copper, palladium, gold, platinum, zinc, tin, titanium, chromium, nickel, tungsten or an alloy of two or more thereof.

A size of the bridge electrode 40 is not particularly limited, and for example, may have a length of 2 to 500 μm on a long side thereof, and preferably, 2 to 300 μm, but it is not limited thereto. If the bridge electrode 40 has the length of 2 to 500 μm on the long side thereof, the sensing pattern may have an appropriate electrical resistance with reduced visibility thereof.

The bridge electrode 40 may have a thickness of 5 to 350 nm, for example. If the thickness thereof is within the above range, it is possible to minimize a decrease in flexibility and transmittance, while improving the resistance.

A bridge of the bridge electrode 40 may have a bar structure, for example.

The bridge electrode 40 may have, for example, a single bridge as illustrated in FIGS. 1 to 7, and may have two or more bridges. When the bridge electrode 40 has two or more bridges, it is advantageous in terms of improving the resistance and reliability.

In addition, the bridge of the bridge electrode 40 may have openings (not illustrated). In this case, an area of the bridge electrode 40 may be decreased to improve flexibility and reduce visibility of the touch sensor.

Further, the bridge electrode 40 may have a mesh structure (not illustrated). In this case, similarly, the area of the bridge electrode 40 may be decreased to improve the flexibility of the touch sensor.

A method of forming the bridge electrode 40 is not particularly limited but may use, for example, the method exemplified as the method of forming the sensing pattern described above.

The touch sensor of the present invention may further include dummy patterns 50 which are formed between the first pattern and the second pattern with being electrically separated therefrom.

Since a refractive index of an area in which the sensing pattern is present and a refractive index of an area in which the sensing pattern is not present are different from each other in the touch sensor, the sensing pattern may be viewed by a user of device including the touch sensor due to a difference in the refractive index.

However, when including the dummy pattern 50 between the first pattern 10 and the second pattern 20, it is possible to prevent the sensing pattern from being viewed by the user by reducing the difference in the refractive index.

Figure 3:
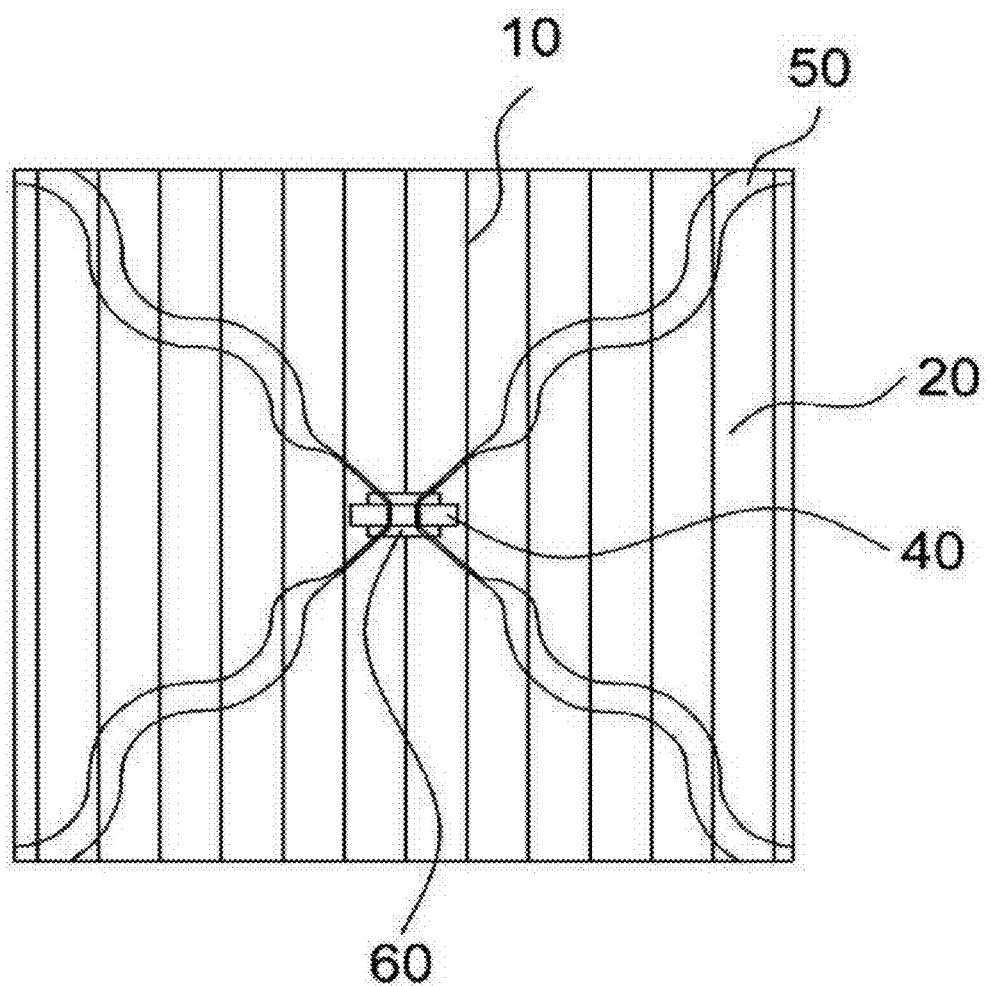

At least one portion of the boundary of the dummy pattern 50 is a curved line corresponding to the convex parts and the concave parts of the first and second patterns 10 and 20. FIG. 3 is a plan view of the touch sensor having such the dummy pattern 50, and as illustrated in FIG. 3, the dummy pattern 50 may have the boundary of a curved surface corresponding to convex parts and the concave parts of the first and second patterns 10 and 20. In this case, since an area in which the dummy pattern 50 is not present between the first pattern 10 and the second pattern 20 may be narrowed, it is possible to minimize the sensing pattern from being viewed by the user.

Figure 4:
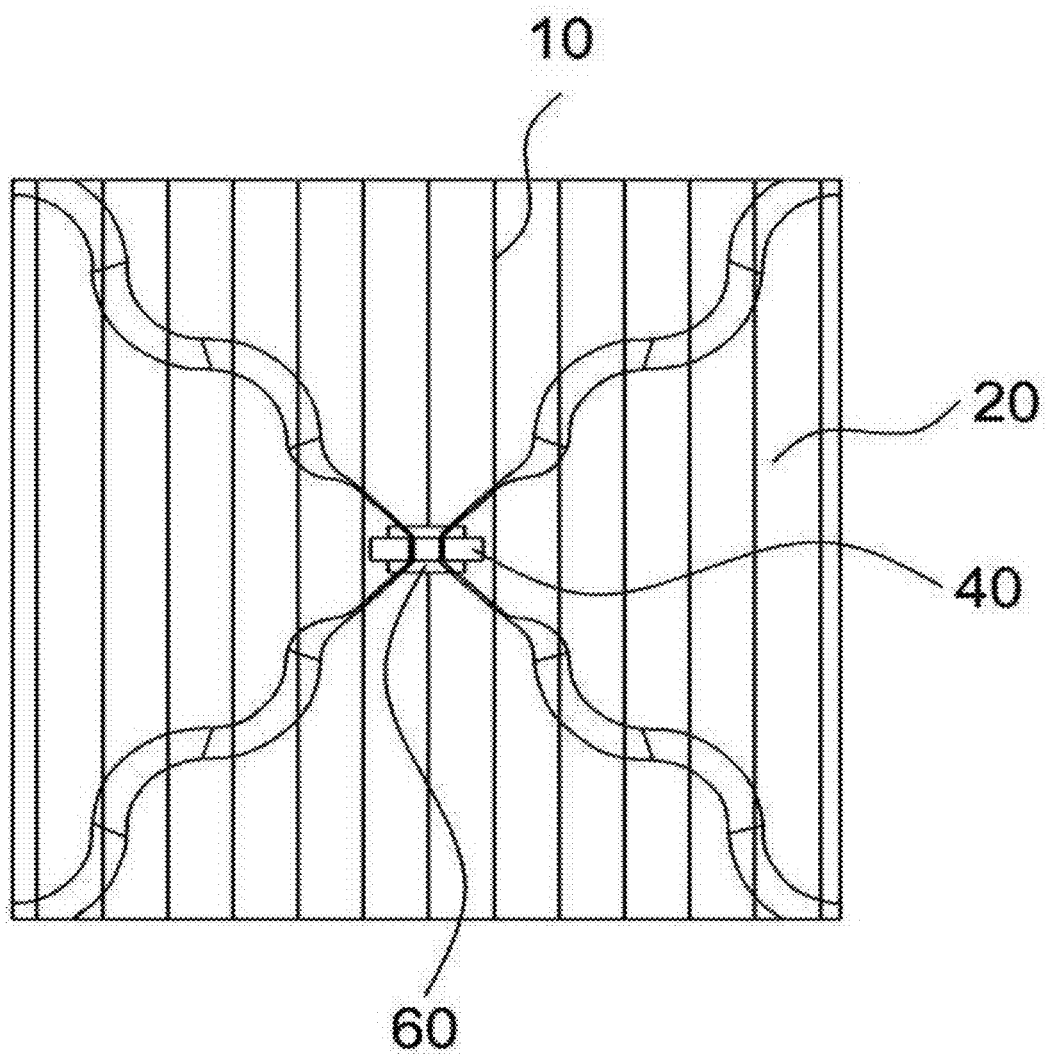

In addition, the dummy pattern 50 may include a plurality of sub dummy patterns which are separated from each other. FIG. 4 is a plan vies of the touch sensor having such the dummy pattern 50, and as illustrated in FIG. 4, the dummy pattern 50 may include the plurality of sub dummy patterns which are separated from each other. In this case, since the plurality of sub dummy patterns of the dummy pattern 50 are separated from each other, flexibility of the touch sensor may be more improved.

A thickness of the dummy pattern 50 is not particularly limited and may be, for example, 10 to 350 nm. If the thickness of the dummy pattern is less than 10 nm, the electrical resistance may be increased to reduce touch sensitivity, and if the thickness thereof exceeds 350 nm, transmittance may be increased to cause a problem entailed in the visibility of the sensing pattern.

A material of the dummy pattern 50 may use the material exemplified as the material of the sensing pattern described above, and in terms of minimizing the difference in the refractive index between the area in which the sensing pattern is present and the area in which the sensing pattern is not present, the dummy pattern 50 preferably uses the same material as the sensing pattern.

A method of forming the dummy pattern 50 is not particularly limited but may use, for example, the method exemplified as the method of forming the sensing pattern described above.

The touch sensor of the present invention further includes the insulation layer 60.

The insulation layer 60 is disposed between the sensing pattern and the bridge electrode 40, and serves to insulate the first pattern 10 and the second pattern 20 from each other.

Figure 5:
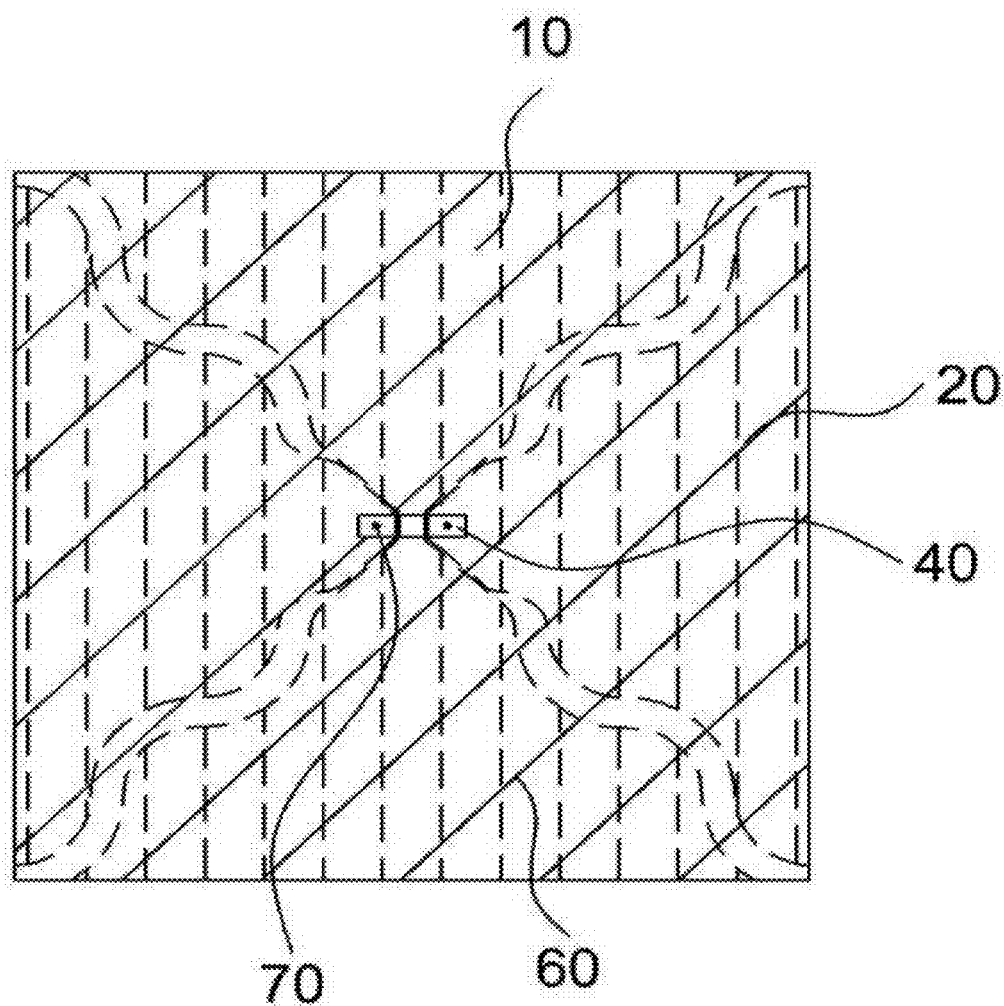

As illustrated in FIG. 2, the insulation layer 60 may be arranged only at an intersect portion of the sensing pattern and the bridge electrode 40 in an island form, and as illustrated in FIG. 5, may be arranged throughout the sensing pattern in a layer form.

When the insulation layer 60 is arranged in the island form, the unit patterns of the second pattern 20 are directly connected with the bridge electrodes 40, while the insulation layer 60 is arranged in the layer form, the unit patterns of the second pattern 20 are connected to the bridge electrode 40 through contact holes 70 formed in the insulation layer 60.

The insulation layer 60 may be formed by using any material and method used in the related art without particular limitation thereof.

In the touch sensor of the present invention, a laminating order of the sensing patterns 10 and 20, and the bridge electrode 40 is not particularly limited. For example, the sensing patterns 10 and 20, and the bridge electrode 40 may be laminated in this order. In this case, the sensing patterns 10 and 20, the insulation layer 60, and the bridge electrode 40 may be laminated in this order as illustrated in FIGS. 1 to 5, which are plan views showing such the structure, respectively.

Figure 6:
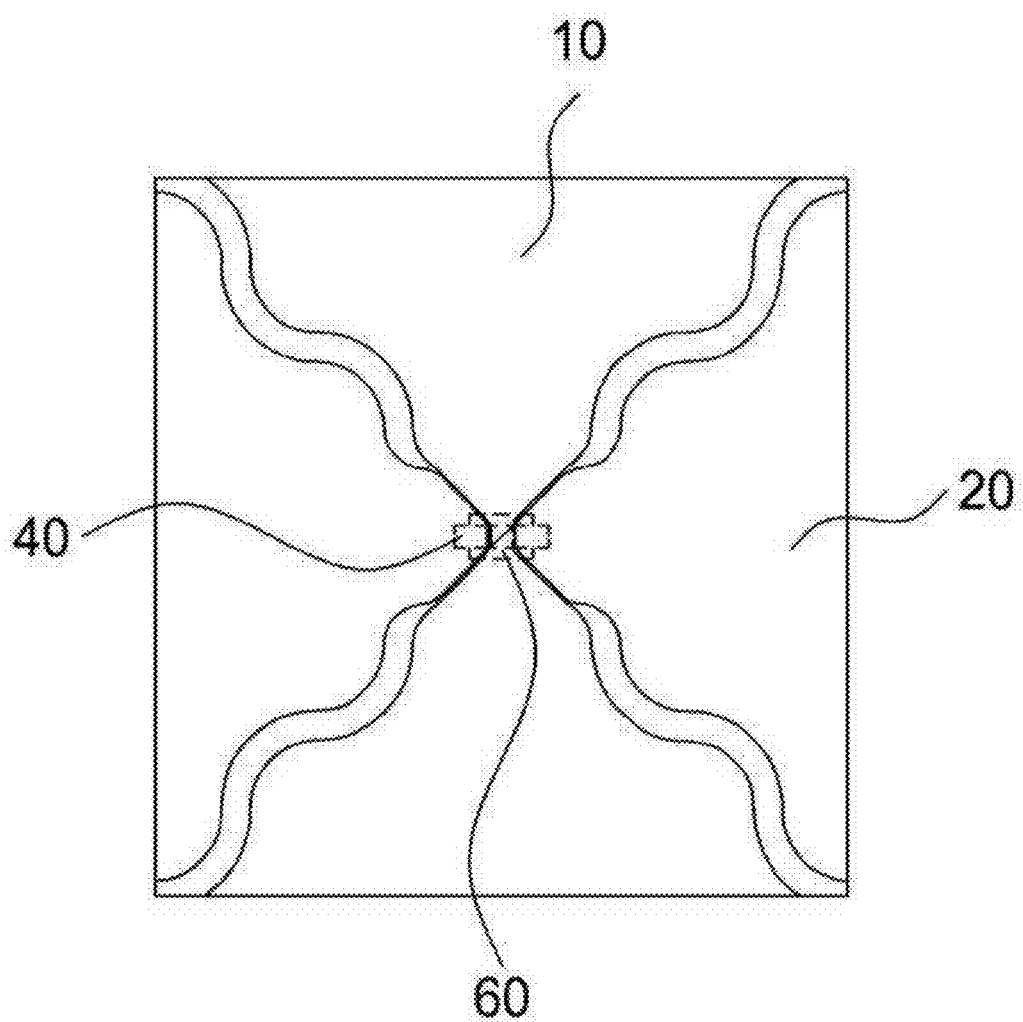

In addition, the bridge electrode 40 and the sensing patterns 10 and 20 may be laminated in this order. In this case, the bridge electrode 40, the insulation layer 60, and the sensing patterns 10 and 20 may be laminated in this order as illustrated in FIG. 6, which is a plan view showing such the structure. The touch sensor of the present invention may be formed on a substrate 100.

The substrate 100 may be made of any material commonly used in the related without particular limitation thereof, and for example, may include polyethersulfone (PES), polyacrylate (PAR), polyetherimide (PEI), polyethylene napthalate (PEN), polyethylene terepthalate (PET), polyphenylene sulfide (PPS), polyallylate, polyimide, polycarbonate (PC), cellulose triacetate (TAC), cellulose acetate propionate (CAP), or the like.

The present invention may further provide an image display device including the above-described touch sensor.

The touch sensor of the present invention may be applicable to typical liquid crystal display devices, in addition, other different image display devices such as electro-luminescent display device, plasma display device, electro-luminescent emission display device, or the like.

Hereinafter, preferred embodiments are proposed to more concretely describe the present invention. However, the following examples are only given for illustrating the present invention and those skilled in the art will obviously understand that various alterations and modifications are possible within the scope and spirit of the present invention. Such alterations and modifications are duly included in the appended claims.

Example 1

A sensing pattern having the structure illustrated in FIG. 1 with a thickness of 400 nm was formed on a PET substrate having a thickness of 50 μm by using ITO and a photolithography method. In this case, the convex parts and the concave parts of the first pattern and the second pattern had a radius of curvature of 0.5 mm.

Thereafter, as illustrated in FIG. 2, an insulation layer having a thickness of 2 μm was formed on a connection part of the sensing pattern by using an organic insulation film and the photolithography method, then a bridge electrode having a length of 382 μm on a long side thereof, and a thickness of 135 nm was formed thereon by using the ITO and photolithography method, thus to prepare a touch sensor.

Example 2

A dummy pattern having the structure illustrated in FIG. 3 with a thickness of 400 nm was further formed on the touch sensor prepared in Example 1 by using the ITO and photolithography method, thus to prepare a touch sensor.

Example 3

A dummy pattern having the structure illustrated in FIG. 4 with a thickness of 400 nm was further formed on the touch sensor prepared in Example 1 by using the ITO and photolithography method, thus to prepare a touch sensor.

Example 4

The same procedures as described in Example 1 were conducted to prepare a touch sensor except that the convex parts and the concave parts of the first pattern and the second pattern had a radius of curvature of 12 mm.

Example 5

The same procedures as described in Example 1 were conducted to prepare a touch sensor except that the convex parts and the concave parts of the first pattern and the second pattern had a radius of curvature of 0.03 mm.

Example 6

The same procedures as described in Example 3 were conducted to prepare a touch sensor except that the convex parts and the concave parts of the first pattern and the second pattern had a radius of curvature of 0.07 mm.

Example 7

The same procedures as described in Example 3 were conducted to prepare a touch sensor except that the convex parts and the concave parts of the first pattern and the second pattern had a radius of curvature of 0.1 mm.

Example 8

The same procedures as described in Example 3 were conducted to prepare a touch sensor except that the convex parts and the concave parts of the first pattern and the second pattern had a radius of curvature of 3.0 mm.

Example 9

The same procedures as described in Example 3 were conducted to prepare a touch sensor except that the convex parts and the concave parts of the first pattern and the second pattern had a radius of curvature of 3.5 mm.

Comparative Example 1

Figure 7:
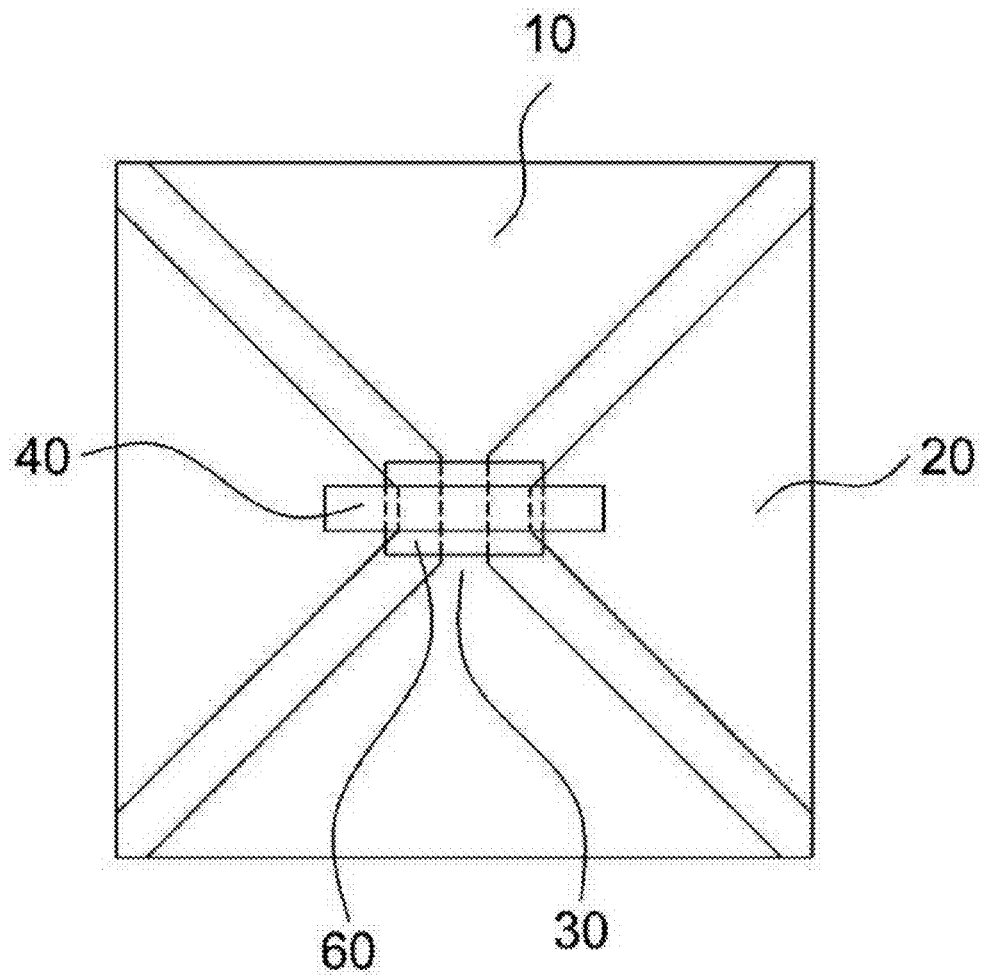
FIGS. 7 and 8 are enlarged plan views of a portion including first and second patterns, a bridge electrode, and an insulation layer in a touch sensor of comparative examples.

The same procedures as described in Example 1 were conducted to prepare a touch sensor except that the sensing pattern was formed in the structure of FIG. 7.

Comparative Example 2

Figure 8:
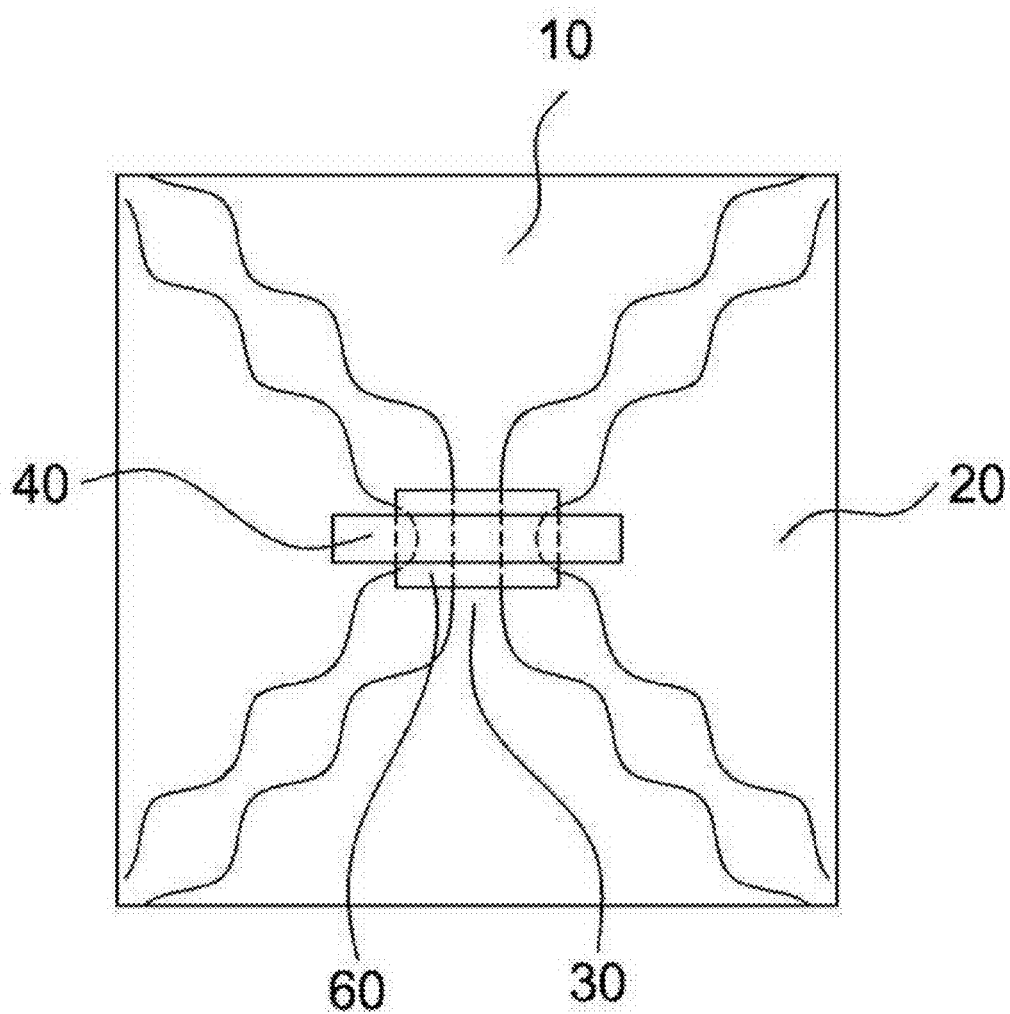

The same procedures as described in Example 1 were conducted to prepare a touch sensor except that the sensing pattern was formed in the structure of FIG. 8.

Experimental Example (1) Evaluation for Occurrence of Curved Cracks

The samples prepared in the examples and comparative examples were introduced under reliability chamber conditions in an environment of a temperature of 85° C. and a humidity of 85% and maintained for 120 hours, then bending with a radius of curvature of 3R was executed thereon 1,000 times. The number of cracks occurred in the touch sensor are summed up, and the evaluated results are described in Table 1 below.

<Standards for Evaluation>

0: any crack was not observed

1: one or two fine cracks occurred in the dummy pattern

2: three or more fine cracks occurred in the dummy pattern

3: one crack occurred in the dummy pattern and connection part

4: two or more cracks occurred in the dummy pattern and connection part

7: failure in function occurred due to disconnection of the patterns

10: measurement of the number of cracks was not possible due to an occurrence of creaks throughout the touch sensor.

(2) Evaluation for Touch Sensitivity

Evaluation of a changed value (ΔCm) in an electrostatic capacitance value was executed after touching the samples prepared in the examples and comparative examples with a 4Ø conductive bar by using electrostatic capacitance function inspection equipment (manufactured by MIK21 Co., Model K-9601T), and results thereof are described in Table 1 below.

(3) Evaluation for Visibility of Sensing Pattern

Cover windows were adhered to the touch sensor prepared according to the examples and comparative examples using OCA, and 100 sensory test panel members visually observed the sensing patterns by irradiating the cover windows with light emitted from a three-wavelength lamp to determine the visibility thereof, and as a result of observation, the number of the test panel members determined to observe the sensing patterns was counted. Result values thereof are described in Table 1 below.

TABLE 1

| Section | Curved crack level | Touch sensitivity with 4Ø conductive bar | Visibility of sensing pattern |
| --- | --- | --- | --- |
| Example 1 | 0 | 0.158 | 22 |
| Example 2 | 0 | 0.171 | 5 |
| Example 3 | 0 | 0.177 | 2 |
| Example 4 | 2 | 0.161 | 35 |
| Example 5 | 3 | 0.157 | 38 |
| Example 6 | 1 | 0.165 | 22 |
| Example 7 | 0 | 0.173 | 9 |
| Example 8 | 0 | 0.175 | 7 |
| Example 9 | 1 | 0.167 | 19 |
| Comparative Example 1 | 10 | 0.152 | 45 |
| Comparative Example 2 | 7 | 0.145 | 26 |

Figure 9A:
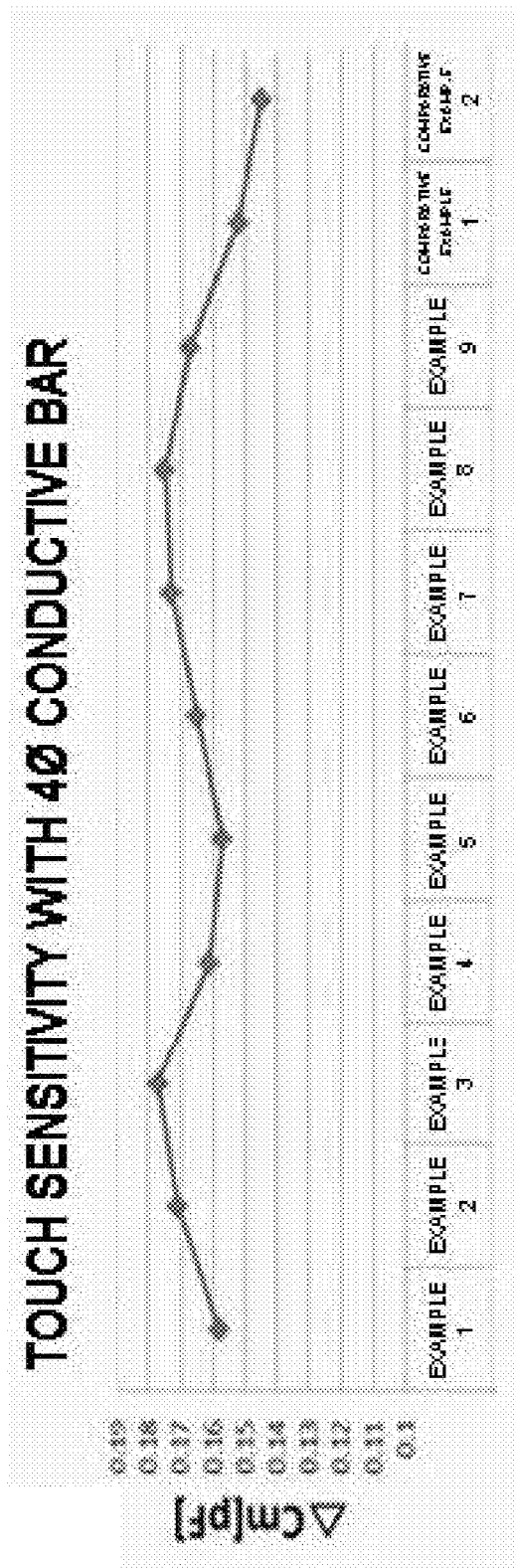
FIGS. 9A to 9C are graphs illustrating results of touch sensitivity, curved crack level, visibility estimated in the touch sensors of examples and the comparative examples.
Figure 9B:
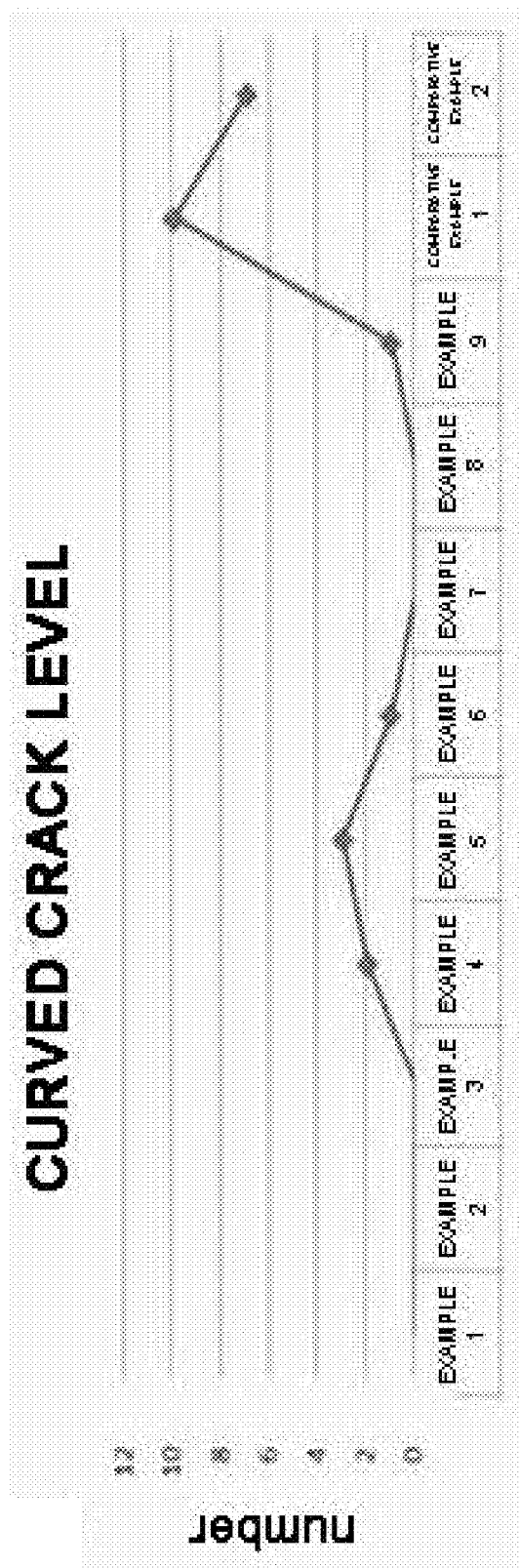
Figure 9C:
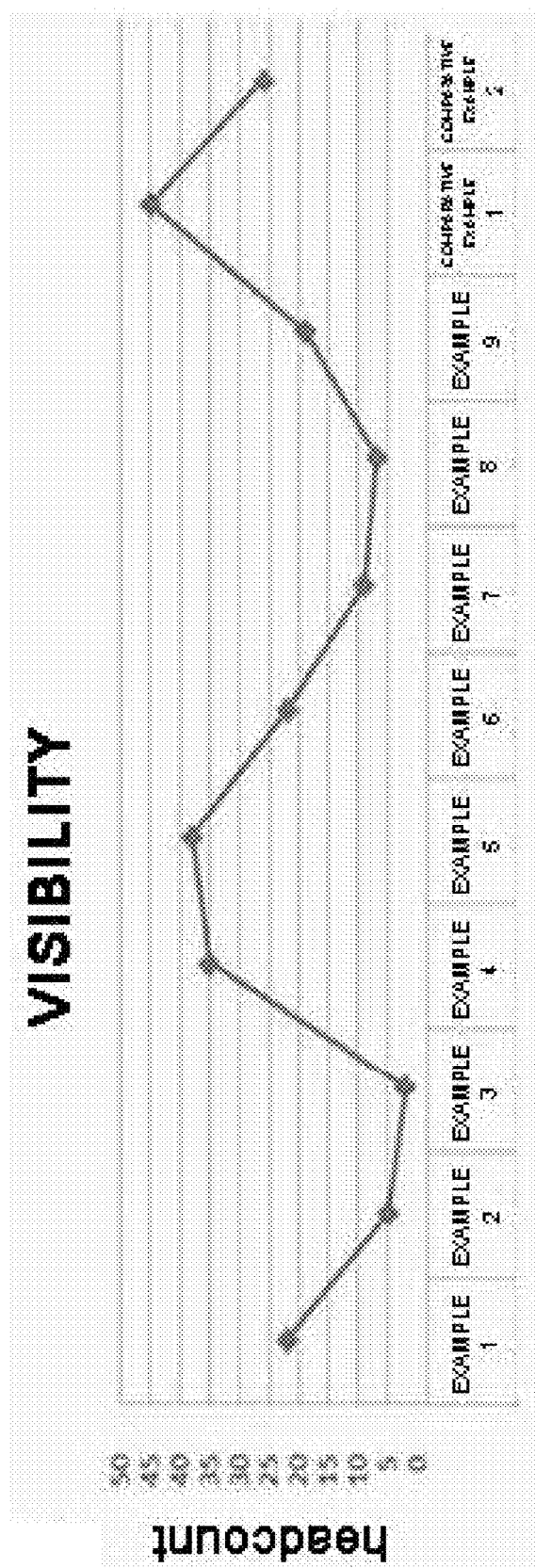

Referring to Table 1 and FIGS. 9A to 9C, it could be seen that the touch sensors of the examples had excellent touch sensitivity with reduced curved cracks occurred therein, and the number of the sensing pattern viewed by the user was significantly reduced.

However, it could be seen that the touch sensors of the comparative examples had decreased flexibility due to an occurrence of the curved cracks and reduced touch sensitivity, as well as, the number of the sensing pattern viewed by the user was significantly increased.

What is claimed is:

1. A touch sensor comprising:
    a sensing pattern including a first pattern which is formed in a first direction and has unit patterns connected with each other through connection parts thereof, and a second pattern which has unit patterns formed with being separated from each other in a second direction; and
    bridge electrodes which connect the separated unit patterns of the second pattern,
    wherein at least a portion of a boundary between the first pattern and the second pattern includes a plurality of convex parts of a curved line and a plurality of concave parts of a curved line between the convex parts;
    the convex part of the first pattern and the concave part of the second pattern face each other, and the concave part of the first pattern and the convex part of the second pattern face each other; and
    the first pattern and the second pattern are conductive and insulated from each other.

2. The touch sensor according to claim 1, wherein the concave part and the convex part have a radius of curvature of 0.05 to 10 mm.

3. The touch sensor according to claim 1, wherein the concave part and the convex part have a radius of curvature of 0.1 to 3 mm.

4. The touch sensor according to claim 1, wherein a boundary in which the first pattern and the connection part contact with each other is a curved line.

5. The touch sensor according to claim 1, wherein a boundary which face the connection part of the second pattern is a curved line.

6. The touch sensor according to claim 1, further comprising dummy patterns which are formed between the first pattern and the second pattern with being electrically separated therefrom.

7. The touch sensor according to claim 6, wherein the dummy pattern is made of the same material as the sensing pattern.

8. The touch sensor according to claim 6, wherein at least a portion of the boundary of the dummy pattern is a curved line corresponding to the convex parts and the concave parts of the first and second patterns.

9. The touch sensor according to claim 6, wherein the dummy pattern includes a plurality of sub dummy patterns which are separated from each other.

10. An image display device comprising the touch sensor according to claim 1.

* * * * *